United States Patent [19]
Hamada

[11] 3,895,838
[45] July 22, 1975

[54] TAILGATE MOUNT
[76] Inventor: Ben Hamada, 900 N. Broadway, Suite 725, Santa Ana, Calif. 92701
[22] Filed: Sept. 4, 1973
[21] Appl. No.: 394,400

[52] U.S. Cl.............. 296/57 R; 16/128 R; 49/388; 296/50
[51] Int. Cl............................................. B60j 5/10
[58] Field of Search............ 296/50, 51, 52, 53, 55, 296/57 R; 16/128 R, 137, 147, 149, 171; 49/388, 389, 465

[56] References Cited
UNITED STATES PATENTS

| 772,001 | 10/1904 | Rust........................................ 49/388 |
| 1,168,983 | 1/1916 | Wallingford...................... 49/388 X |
| 1,222,570 | 4/1917 | Williams........................... 16/171 X |
| 3,114,942 | 12/1963 | Abedon et al......................... 49/388 |
| 3,656,801 | 4/1972 | Doutt et al........................ 296/57 R |
| 3,734,560 | 5/1973 | Cramblet............................. 296/50 |

FOREIGN PATENTS OR APPLICATIONS

| 987,169 | 4/1951 | France.................................. 296/51 |

*Primary Examiner*—Albert J. Makay
*Assistant Examiner*—Leslie J. Paperner

[57] ABSTRACT

A moveable mount for truck tailgate hinges is presented. The mount comprises a base bent near one end which is coupled to the side of the truck and has a hinge pin at its opposite end. The mount may be held away from the side of the truck thereby securely holding the hinges of the tailgate in position in a first locked mode. In a second unlocked mode, the mount end comprising the hinge pin 20 is moved closer to the side of the truck, thereby permitting easy removal of the tailgate of the truck.

2 Claims, 6 Drawing Figures

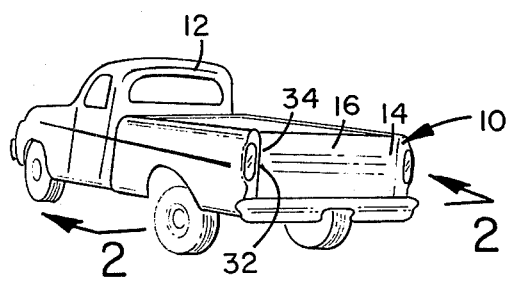
FIG. 1
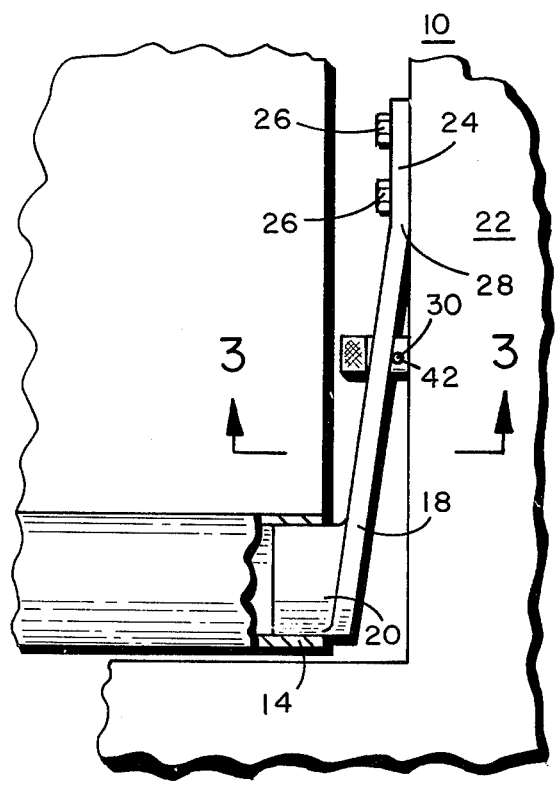
FIG. 2
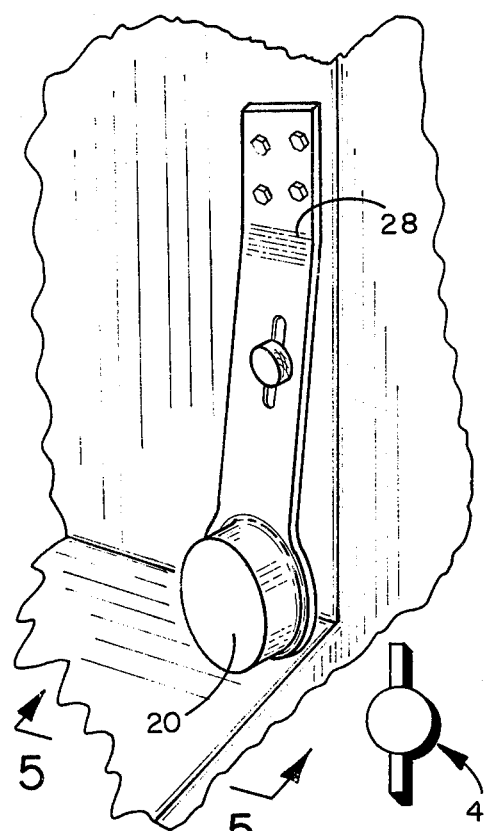
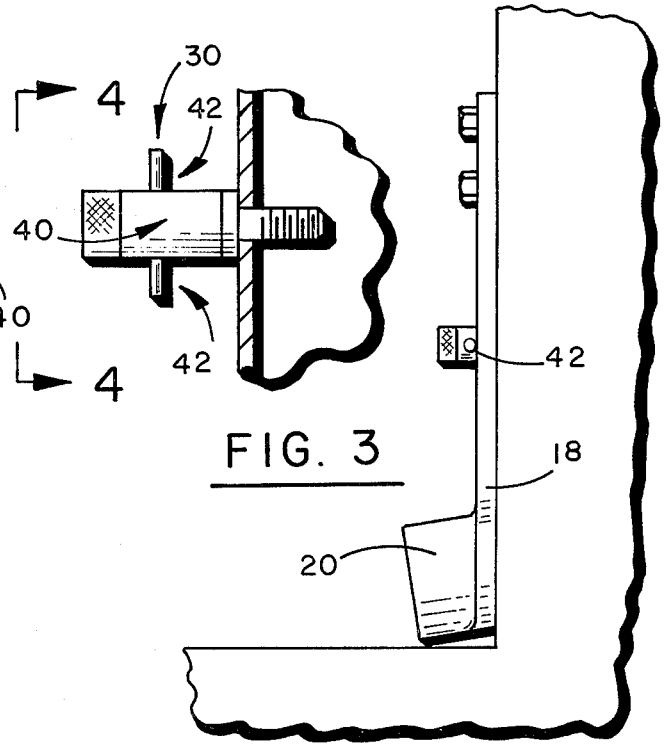
FIG. 4
FIG. 3
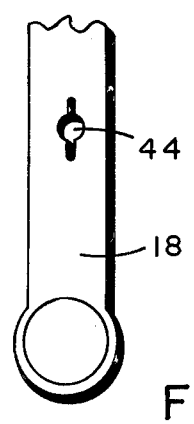
FIG. 5
FIG. 6

TAILGATE MOUNT

BACKGROUND OF THE INVENTION

The present invention relates to mounts for easily removable truck tailgates.

DESCRIPTION OF THE PRIOR ART

In recent years there has been a vast increase in the use of recreational vehicles. Many persons owning trucks with tailgates are now using the trucks for campers and for other recreational purposes. The operators, therefore, frequently wish to remove or attach the tailgate of the trucks in order to use the same truck for more than one purpose.

Most trucks now in common use have tailgates which couple to hinges which are removably coupled to hinge pins which are bolted to the side of the truck. The removal and replacement of the tailgate requires removal of the bolts holding the mount for the hinge pin in place, a difficult and time-consuming procedure.

The prior art discloses no hinge permitting easy removal and replacement of tailgates.

Perhaps the closest prior art to the present invention is the Doutt U.S. Pat. No. 3,656,801, which illustrates a replaceable hinge for a truck body tailgate comprising a socket part having a longitudinal slot in it and another part having a flat hinge stud, one of said parts being secured to an end of the tailgate and the other part to a side wall of the truck body. The prior art discloses no movable hinges which are coupled to the truck and may be locked in to a tailgate retaining position and may be unlocked and moved to permit removal of the tailgate.

SUMMARY OF THE INVENTION

A moveable mount for truck tailgate hinges is presented.

The mount is semi-rigid and is coupled to one side of a truck. The opposite side of the truck has a normal hinge pin.

The mount comprises a base having a first end coupled to the side of the truck and a second end having coupled thereto a hinge pin. The base is generally planar and rectangular and is bent at a small angle along a line perpendicular to the length of the base along the plane. The base is removably coupled to bistable means capable of retaining the base in two positions, a first position slightly bent and a second position more bent than the first position. The bend is near the first end of the mount which is coupled to the side of the truck.

When the base is bent, the hinge pin coupled to the base is in the position in which it functions as the hinge pin for the truck. When the base is less bent the distance between the hinge pin coupled to the base and the hinge pin coupled to the opposite side of the truck exceeds the length of the hinge of the truck tailgate.

In a first example of the invention, the surface of the base defines a hole through the center thereof generally parallel to the axis of the hinge pin coupled thereto and the bistable means comprise rotatable cam means rotatably coupled to the truck and capable of passing through the hole when oriented in a first selected direction and incapable of passing through the hole when oriented in a second selected direction. Accordingly, the mount in a first position holds the hinge pins so closely together that the hinge cannot be removed. In the second position when the base is bent less, the hinge pins are held so far apart that the tailgate may easily be removed.

When the owner wishes to remove the tailgate, he rotates the cam so that the cam can pass through the hole, pushes the mount toward the side of the truck so as to straighten the base and increase the distance between the hinge pins, and removes the tailgate. He replaces the tailgate with appropriate other apparatus. When he wishes to replace the tailgate, he removes the other apparatus, couples the opposite tailgate hinge end to the fixed hinge pin on the opposite side of the truck, and rotates the bistable means comprising the cam so that the cam can pass through the hole and the base can bend more reducing the distance between the two hinge pins and so that the hinge pins securely hold the tailgate in place.

Those skilled in the prior art will see obvious equivalents to the particular example described herein within the scope of the present invention.

DRAWING SUMMARY

Reference should be made at this time to the following detailed description which should be read in conjunction with the following drawings of which:

FIG. 1 illustrates the mount on the rear end of a truck;

FIG. 2 illustrates a side view of the invention;

FIG. 3 illustrates the side view of an example of locking means;

FIG. 4 illustrates a three-quarter view of the invention;

FIG. 5 illustrates a view of the invention from a 90° angle to the plane of the side of the truck; and FIG. 6 illustrates a part of the view of FIG. 2 in a different position.

DETAILED DESCRIPTION

Reference should be made at this time to FIG. 1 which illustrates a truck 12 having a semi-rigid tailgate mount 10 according to the present invention. The mount 10 is mounted on one side of the truck 12 so that the hinge end 14 of the tailgate 16 is fixedly coupled to the hinge pin 20 of the mount 10 during normal operation. The location of the opposite fixed hinge pin 32 and the hinge end 34 coupled thereto is generally indicated on FIG. 1.

Reference should be made at this time to FIG. 2 which illustrates a side view of the mount 10. The mount 10 comprises a single, integral generally planar base 18 coupled at a first end 24 to the side 22 of the truck 12 by coupling means 26. The coupling means 26 may comprise bolts or other means known to the prior art and having coupled thereto on a second end a hinge pin 20.

Reference should be made at this time to FIGS. 3 and 4 which better illustrate selected views of the invention. During normal operation, the base 18, which is generally planar, is bent out away from the side 22 of the truck 12 at along a line 28 slightly removed from the coupled end 24. The hinge pin 20 is held out away from the side 22 of the truck 12 during normal operation, because the end of the base 18 to which it is coupled is held out away from the side 22 of the truck 12 by locking means 30. Holding the hinge pin 20 away from the side 22 securely holds the tailgate 16 in a manner similar to the manner in which it is held in a prior art truck.

When the owner wishes to remove the tailgate, as illustrated in FIG. 6, he unlocks the locking means 30 permitting him to bend the base 18 at the line 28 so that the hinge pin 20 is moved closer to the side 22 and farther from the hinge pine 32 on the other side of the truck which holds the other hinges of the tailgate. When the hinge pin 20 is moved toward the side 22, the distance between the hinge pin 20 and the other hinge pin 32 increases so as to exceed the distance between the hinge ends 14, 34 (location illustrated on FIG. 1) of the tailgate 16. The tailgate is then very easily removed. The tailgate may be replaced by a camper or other assexxory, according to the owner's wishes.

The truck hinge comprises two ends, 14, 34, which are referred to as hinge ends. When the tailgate is to be put back on, the owner couples one hinge end 34 of the tailgate 16 to the opposite hinge pin 32, moves the hinge pin 20 toward the side 22 of the truck by reducing the bend in the base 18, as shown in FIG. 6, thereby increasing the distance between the hinge pins 20, 32, then permits the base 18 to bend along the line 28 so that the hinge end 14 couples to the hinge pin 20. The locking means 30 are then locked into place locking the base 18 into its bent position along the line 28, holding and locking the hine pin 20 away from the side 22 of the truck 12. The distance between the hinge pins 20, 32 is thereby maintained in a relationship wherein the distance is less than the distance between the hinge ends 14, 34, securely holding the tailgate 16 in position in a manner analogous to the way it is held in prior art trucks.

The surface of the base 18 defines a hole 44 through the center thereof generally parallel to the axis of the hinge pin 20 coupled thereto. As best shown in FIG. 3, the bistable means comprise a rotatable cam means 40 having a cam 42. The rotatable cam means 40 are rotatably coupled to the side 22 of the truck 12. The rotatable cam means pass through the hole 44 regardless of the position of the base 18 during operation. The rotatable cam means include a cam 42 capable of passing through the hole 44 when oriented in a first selected direction and incapable of passing through the hole 44 when rotated in a second selected direction.

When the owner or operator wishes to change the orientation of the base 18 by bending it more or less, he rotates the rotatable cam means 40 so that the cam 42 is oriented to pass through the hole 44. He then bends the base 18 so that the cam 42 is moved relative to the base 18 to the opposite side of the base 18. He then rotates the cam shaft 40 so that the cam 42 no longer can pass through the hole 44, thereby locking the base 18 into its new position. The distance of the cam 42 from the side 22 of the truck 12 remains relatively constant while the base 18 defining the hole 44 passes from one side to the other side of the cam.

A particular example of the invention has been described herein to fulfill the requirements of U.S.C. 112. Those skilled in the art will note that many other examples which are the equivalent of the present invention are possible within the scope of the present invention. The scope of the present invention is limited only by the following claims:

I claim:

1. A semi-rigid mount for a hinged truck tailgate, comprising:

a single integral generally planar base having a bend near a first end which end is fixedly coupled to the side of the truck, the base having a second end having coupled thereto a hinge pin, wherein the surface of the base defines a hole through the center thereof generally parallel to the axis of the hinge pin coupled thereto; bistable rotatable cam means removeably coupled to the base, the cam means capable of retaining the base in two positions, a first position bent and a second position less bent than the first position, the rotatable cam means rotatably coupled to the truck and passing through the hole, wherein the rotatable cam means include a cam capable of passing through the hole when oriented in a first selected direction and incapable of passing through the hole and thereby holding the base in the first position when rotated in a second selected direction.

2. The invention of claim 1 coupled to one side of the truck which truck has a hinge pin coupled to the opposite side so that when the base is bent, the hinge pin coupled to the base is in position to function as a normal hinge pin for the truck, and when the base is less bent, the distance between the two hinge pins exceeds the length of the hinge of the truck tailgate, thereby permitting removal of the truck tailgate.

* * * * *